US00RE40890E

(19) United States
(12) Reissued Patent
Small et al.

(10) Patent Number: US RE40,890 E
(45) Date of Reissued Patent: Sep. 1, 2009

(54) TEMPERATURE COMPENSATED HIGH POWER BANDPASS FILTER

(75) Inventors: Derek J. Small, Raymond, ME (US); John A. Lunn, Portland, ME (US)

(73) Assignee: Electronics Research, Inc., Chandler, IN (US)

(21) Appl. No.: 10/437,616

(22) Filed: May 14, 2003

(Under 37 CFR 1.47)

Related U.S. Patent Documents

Reissue of:
(64) Patent No.: 6,232,852
Issued: May 15, 2001
Appl. No.: 09/251,247
Filed: Feb. 16, 1999

(51) Int. Cl.
*H01P 1/20* (2006.01)
*H01P 7/06* (2006.01)
*H01P 7/00* (2006.01)

(52) U.S. Cl. ..... 333/208; 333/212; 333/230; 333/234; 333/229

(58) Field of Classification Search ..... 333/208, 333/212, 230, 234, 229
See application file for complete search history.

(56) References Cited

U.S. PATENT DOCUMENTS 2,528,387 A * 10/1950 Niessen
3,202,944 A * 8/1965 Grande
4,127,834 A * 11/1978 Stringfellow et al. ..... 333/229
4,630,009 A * 12/1986 Tang
4,644,303 A * 2/1987 Jachowski et al. ..... 333/229
4,706,053 A * 11/1987 Giavarini
5,374,911 A * 12/1994 Kich et al. ..... 333/209
5,428,323 A * 6/1995 Geissler et al.
5,589,807 A * 12/1996 Tang
5,867,077 A * 2/1999 Lundquist ..... 333/208
5,905,419 A * 5/1999 Lukkarila ..... 333/234
5,977,849 A * 11/1999 Hsing et al. ..... 333/232
6,433,656 B1 * 8/2002 Wolk et al. ..... 333/248
6,897,746 B2 * 5/2005 Thomson et al. ..... 333/229

FOREIGN PATENT DOCUMENTS

JP 61218522 * 4/1988

OTHER PUBLICATIONS

Paul A. Goud; Cavity Frequency Stabilization with Compound Tuning Mechanisms; Dept. of Electrical Engineering, University of Alberta, Edmonton, Alberta, Canada; Mar. 1971; pp. 55–56 and 58.*

* cited by examiner

*Primary Examiner*—Patricia Nguyen
(74) *Attorney, Agent, or Firm*—C. Richard Martin

(57) ABSTRACT

A bandpass filter makes use of at least one waveguide cavity that is thermally compensated to minimize drift of a resonant frequency of the cavity with thermal expansion of cavity components. The compensation relies on deformation of the shape of at least one cavity surface in response to thermally-induced dimensional changes of the cavity. A control rod is used to limit the movement of a point on the deformed surface, while the rest of the surface moves with the thermal expansion. The control rod is made of a material having a coefficient of thermal expansion that is significantly different than that of other filter components. The rod may also be arranged to span more thermally expandable material than defines the filter such that, as the filter expands, the point of deflection is moved toward the interior of the filter beyond its original position. A similar effect may be accomplished by connecting the control rod to an end deflecting rod that does the actual limiting of the movement of the deflection point. If the end deflecting rod has a coefficient of thermal expansion that is higher than that of the control rod, the end deflecting rod will expand with temperature relative to the end of the control rod, forcing the deflection point inward.

35 Claims, 3 Drawing Sheets

TEMPERATURE COMPENSATED HIGH POWER BANDPASS FILTER

Matter enclosed in heavy brackets [ ] appears in the original patent but forms no part of this reissue specification; matter printed in italics indicates the additions made by reissue.

FIELD OF THE INVENTION

The invention relates generally to the field of electromagnetic signal communication and, more particularly, to the filtering of high power signals for broadcast communications.

BACKGROUND OF THE INVENTION

In the field of broadcast communications, electrical filters are required to separate a desired signal from energy in other bands. These bandpass filters are similar to bandpass filters in other fields. However, unlike most other electrical bandpass filters, filters for broadcast communication must be capable of handling a relatively high input power. For example, a signal input to a broadcast communications filter might have an average power between 5 and 100 kilowatts (kW). Many electronic filters do not have the capacity for such large signal powers.

For many years, high power electrical bandpass filtering has included the use of waveguide cavity filters. In particular, the introduction of dual-mode cavities for microwave filters in 1971 made a significant contribution to the art. Dual-mode filters allowed for a reduction in filter size and mass, and could realize more complex filter functions by their ability to easily couple non-adjacent resonators. Later reductions in size and mass were achieved with the introduction of triple and quadruple mode filters.

While dual-mode waveguide cavity filters have been used often for space and satellite communications, they have also been used for terrestrial television broadcast applications. Indeed, for transmitters operating in a common amplification mode (i.e., a mode in which both audio and video signals are being amplified together), dual-mode filters have become predominant because of their low loss and ability to realize complex filter functions. Moreover, dual-mode filters have been favored for the transmission of analog television signals because of their flexibility in realizing wide pass bandwidths to compensate for frequency drift due to RF heating and ambient temperature changes. However, with the advent of digital television, system requirements have changed. The FCC emissions mask for digital television broadcast stations is very restrictive for power radiated into adjacent channels or out-of-band frequencies. These requirements will not be satisfied by filters that have wide passbands that are allowed to drift.

In the past, waveguide cavities have been developed that are adjustable to compensate for thermal expansion. Paul Goud in Cavity Frequency Stabilization with Compound Tuning Mechanisms, Microwave Journal, March 1971 discloses a waveguide cavity that may be adjusted to compensate for thermal expansion. In FIG. 2 of the article, Goud shows a compound tuning mechanism that may be used to change the effective length of the filter cavity. However, this tuning mechanism requires a manual adjustment of a screw device to make the necessary changes. Moreover, the movable surface is based on a two-section choke. This choke must be unconnected to the sides of the filter, so that it may be moved relative to them. As such, the cavity is unsealed, and is prone to leakage and poorer performance than a sealed filter.

More recently, filter design has addressed the need for narrower bandwidth filters by constructing filters from materials with lower thermal expansion coefficients to minimize the effect of heating on the filter dimensions. In particular, the nickel/steel alloy Invar® (a registered trademark of Imphy, S.A., Paris, France) has been used as a cavity material. Because of its extremely low degree of thermal expansion, the cavities built with Invar® suffer less of a dimensional change with heating, and therefore maintain a narrower, more stable passband. However, Invar is also very expensive, and consequently drives up the overall cost of the filter.

SUMMARY OF THE INVENTION

In accordance with the present invention, a bandpass filter is provided that uses the deformation of a cavity surface in response to thermal changes to compensate for the resonant frequency shifting effects of thermal expansion. The filter has at least one waveguide cavity in which an input electrical signal resonates at a desired resonant frequency, and a plurality of surfaces, each with a predetermined geometric shape. For example, in a preferred embodiment, the filter has a cylindrical outer surface and a circular end plate. A thermal compensator is provided that responds to thermally induced changes in dimensions of the cavity by distorting the shape of one of the cavity surfaces, thereby minimizing any resulting drift in the resonant frequency.

Typically, the thermally induced changes in the cavity are an increase in cavity dimensions, and the thermal compensator deflects one of the cavity surfaces inward, such as in the case of a concave deflection of the cavity end plate. In the preferred embodiment, the thermal compensator includes a control rod that limits the movement of at least a first point on an end plate of the cavity in a first direction. That is, the control rod prevents movement of that point in the direction of thermal expansion. Thus, as the cavity expands, outer portions of the end plate move in the direction of the expansion, but the first point is restricted by the control rod. As a result, the end plate is deformed from its original shape. The control rod has a coefficient of thermal expansion that is significantly different (typically lower) than that of a material from which the cavity is constructed.

In one embodiment, the control rod fixes a point on the cavity end plate relative to a different location on the filter. This different location may be such that the control rod spans more thermally expanding material than that which defines the waveguide cavity. In such a case, the thermal expansion causes the point of deflection to be moved relative to its original position. In other words, whereas the deflection point initially resides in a first plane perpendicular to the direction of thermal expansion, the expansion of the thermally expanding material spanned by the control rod forces the deflection point out of its original plane toward an interior of the cavity. In another embodiment, a similar inward movement of the deflection point may be accomplished by using an end deflecting rod that connects the control rod to the deflection point. If the end deflecting rod has a coefficient of thermal expansion that is significantly higher than that of the control rod, its expansion will force the deflection point inward relative to the control rod. Naturally, these two techniques may also be combined.

In determining the appropriate amount that a cavity surface point should be deflected, a theoretical model may be used to first establish how far a movable end plate would have to be moved to compensate for an expansion of the waveguide cavity without the end plate being distorted. The resulting deflection distance may then be augmented to compensate for the fact that, in the present invention, the entire surface is not being moved. This additional deflection may be determined empirically, and can provide a more accurate compensation for control of the cavity resonant frequency.

In a preferred embodiment, the waveguide cavity is one of two cavities, which are coupled together via an iris plate. Each of the cavities may be thermally compensated in the manner described herein. One particularly preferred embodiment is a six section filter consisting of two thermally compensated waveguide cavities, each with two orthogonal resonant modes, and two coaxial resonators, each coupled to one of the waveguide cavities via an impedance inverter. The signal to be filtered is input through one of the coaxial resonators to one of the waveguide cavities and output through the other coaxial resonator.

DETAILED DESCRIPTION OF THE PREFERRED EMBODIMENTS

Figure 1:
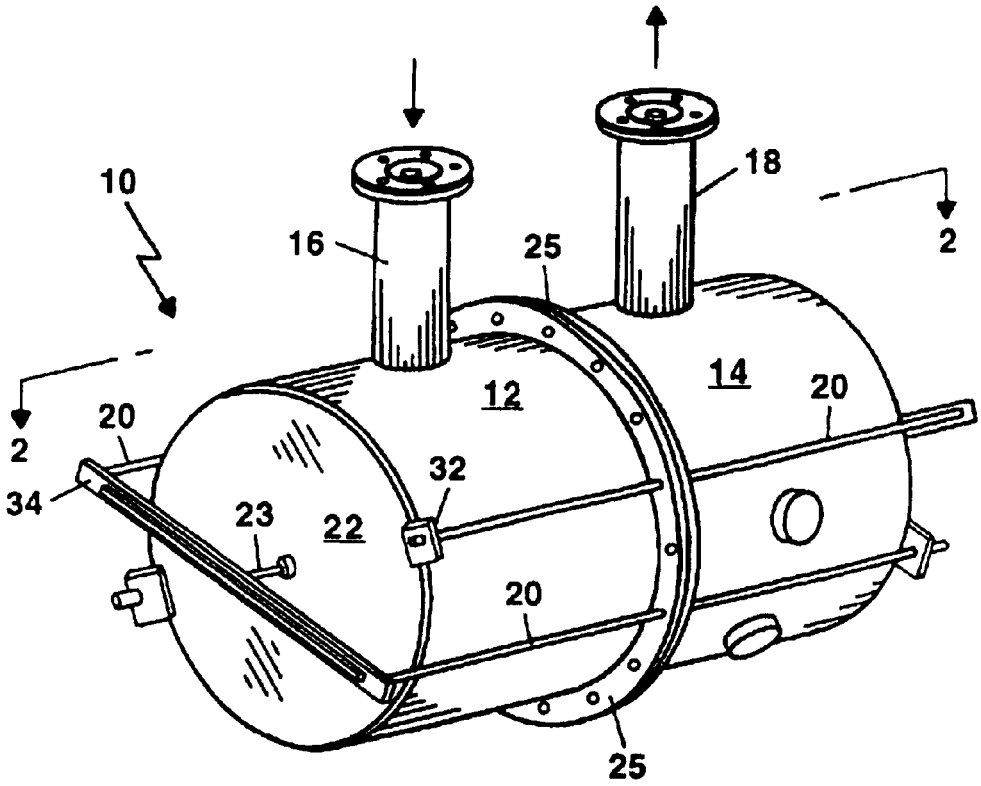
FIG. 1 is a perspective view of a bandpass filter according to the present invention.
Figure 2:
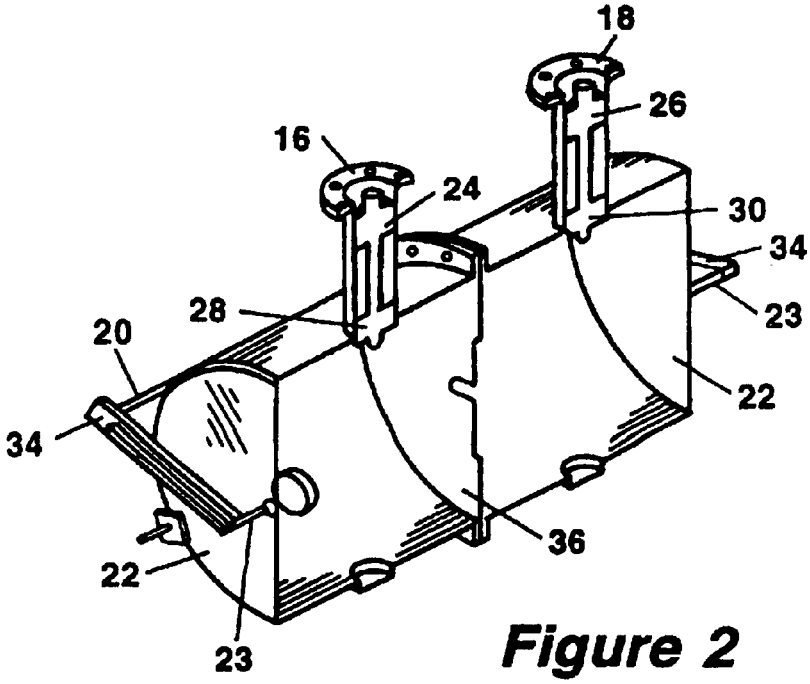
FIG. 2 is a cross sectional perspective view of the filter of FIG. 1.

Shown in FIG. 1 is a perspective view of a temperature compensated pseudo-elliptical function mixed mode bandpass filter 10. The filter of FIG. 2 is particularly suitable for high power broadcast applications, and has an aluminum $TE_{11}$ cavity consisting of cavity portion 12 and cavity portion 14. The filter 10 also has an input stage 16 containing a coaxial resonator, and an output stage 18 containing a coaxial resonator. The filter uses a set of thermal control rods to control the position of the center point of each of two cavity end plates 22 relative to an opposite end of the cylindrical cavity housing. This causes the end plates 22 to deflect when the aluminum cavity housing expands, thereby minimizing thermal drift of the filter pass band due to dimensional changes of the filter cavities.

The filter 10 is shown in cross section in FIG. 2. A coaxial cable (not shown) is connected to filter input stage 16 to allow signal input to the filter. Likewise, the filter output is directed to a coaxial cable (not shown) via output stage 18. Each of the input and output stages consists of a respective TEM coaxial resonator 24, 26. The coaxial resonators use inner conductors of a material with a low coefficient of thermal expansion, such as Invar, to provide them with good temperature stability. That is, the use of Invar inner conductors gives the TEM resonators good dimensional stability, and therefore good frequency stability, with changes in temperature. The input coaxial resonator 16 also uses an impedance inverter 28 for coupling into the waveguide cavity. Likewise, the output coaxial resonator uses an impedance inverter 30 for coupling out of the cavity.

Impedance inverters are found in most microwave RF filter designs, and not discussed in any great detail herein. In the filter of FIG. 1, the impedance inverters have the effect of converting the shunt inductance-capacitance of the each of the coaxial resonators to an inductance-capacitance in series with the waveguide cavity stages. That is, the impedance inverters enable the resonant filter characteristics of the coaxial resonators to be series coupled with the resonant filter characteristics of the waveguide cavity filter stages. Similarly, the iris plate 36 separating the two waveguide cavities functions as an impedance inverter between those two stages. The use of TEM mode coaxial resonators with the dual cavity resonator provides a particular mixed mode that increases the spurious suppression as compared to a filter based on a pure $TE11_n$ mode design, since the filter band of each coaxial resonator blocks noise outside of the pass band it defines.

As mentioned above, control rods provide thermal stability to the cavity waveguide. In the embodiment of FIGS. 1 and 2, the filter includes side bracing control rods 20 and end deflecting rods 23. Unlike the other components of the waveguide stages, such as the aluminum cavity housing, the side bracing control rods are made of a material having a very low coefficient of thermal expansion, such as Invar. Meanwhile, the end deflecting rods 23 are preferably aluminum, for reasons that are discussed in more detail hereinafter. The control rods 20 and end deflecting rods 23 are arranged in two control assemblies that control the position of the center of each end plate 22 relative to the edge of the cavity housing at the opposite end of the adjacent cavity.

As shown, each control assembly has two side bracing rods 20, each of which is secured at one end by a mounting clip 32 to the edge of the cavity housing. At the opposite end, the bracing rods 20 are fixed to a lateral support 34. The side bracing control rods 22 each reside within a pair of "pass-through" holes in mounting plates 25. Mounting plates 25 provide the means by which to fasten the two cavity housings 12, 14 together and to secure the iris plate 36 separating the cavities. The center of each of the lateral supports 34 is secured to an end deflecting rod 23 that maintains a fixed distance between its respective support and the center of the adjacent end plate 22. Thus, a first bracing assembly establishes a bracing frame between the edge of cavity 12 and the center of the end plate of cavity 14, while the other bracing assembly maintains a bracing frame between the edge of cavity 14 and the center of the end plate of cavity 12.

Because of its relatively small thickness in the axial dimension of the filter (i.e., in a direction parallel to the longitudinal axis of the control rods), the thermal expansion of the lateral supports is negligible for the expected operating temperature range of the filter. Furthermore, the embodiment of FIGS. 1 and 2 shows only two bracing assemblies of three control rods each. However, those skilled in the art will recognize that additional control rods may be used, if desired. However, the use of only two assemblies helps to minimize the amount of low expansion coefficient material, the cost of which represents a significant manufacturing expense.

It is known in the art that the resonant frequency f of a cylindrical $TE11_n$ cavity may be expressed as:

$$f = c\sqrt{\left(\frac{x}{\pi}\right)^2 \frac{1}{D^2} + \left(\frac{n}{2}\right)^2 \frac{1}{L^2}}$$

where c is the speed of light, D is the cavity diameter, L is the cavity length, n is the number of half wavelengths that contained in the distance L, and x is a zero of a Bessel function dependent on the mode being considered. For example, if n=1 (i.e., the cavity is a $T_{111}$ cavity), x=1.841. It has also been shown that this equation may be differentiated with respect to temperature to give the relationship:

$$\frac{1}{f}\frac{\Delta f}{\Delta T} = -\frac{\left(\frac{D}{L}\right) + \frac{d}{\Delta T}\left(\frac{D}{L}\right)}{\left(\frac{D}{L}\right)^2 + A^2} - \frac{1}{D}\frac{\Delta D}{\Delta T}$$

$$\text{where: } A = \frac{2x}{n\pi}$$

From this, some of the desired parameters of the waveguide may be determined.

Since the equation above represents the frequency changes in a cylindrical cavity filter with changes in temperature, a stable cavity construction may be determined by setting this equation equal to zero. In other words, when $$\frac{1}{f}\frac{\Delta f}{\Delta T} = 0,$$

the filter cavity is stable with temperature. By substitution and reduction, the following relationship results:

$$\left(\frac{1}{L}\right)\frac{\Delta L}{\Delta T} = -A^2\left(\frac{L}{D}\right)^2\left(\frac{1}{D}\right)\frac{\Delta D}{\Delta T}$$

Notably, the coefficient of thermal expansion for the length of the cavity ($CTE_L$) is proportional to:

$$\left(\frac{1}{L}\right)\frac{\Delta L}{\Delta T}$$

and the coefficient of thermal expansion for the cavity diameter ($CTE_D$) is proportional to:

$$\left(\frac{1}{D}\right)\frac{\Delta D}{\Delta T}$$

Thus, for a thermally stable cylindrical cavity, the ratio of $CTE_L$ to $CTE_D$ may be expressed as:

$$\frac{CTE_L}{CTE_D} = -A^2\left(\frac{L}{D}\right)^2$$

The relationship above may be used to modify the length of the cavity to compensate for changes in cavity diameter so as to keep the resonant frequency of the cavity stable. A particular cavity design has a predetermined length and diameter, as well as a particular value for each of the mode-specific variables x and n that make up A. Thus, for that cavity, a particular value for the ratio of $CTE_L$ to $CTE_D$ can be found. Given that ratio, one may determine how one of those parameters must be changed relative to the other in order to maintain a stable resonant frequency. This provides the basis for the thermal compensation of the cavity. For example, if a cavity had a diameter D=17" and a length L=18", and a value for A of 1.172 (given, e.g., x=1.84 and n=1), then the ratio of $CTE_L$ to $CTE_D$ would be −1.54. Therefore, to maintain the resonant frequency of the cavity, an increase in its diameter must be met with a reduction its length (since the ratio is negative), where the length change has a magnitude of 1.54 times the diameter change.

While an adjustment mechanism might be used to physically move one or both of the end plates of the filter cavity in response to changes in its diameter, this would require the use of chokes or "bucket shorts" so that the mechanical changes in the cavity shape could be made. Such movable end plates tend to reduce the performance of the filter, and are therefore undesirable. Therefore, in the present invention, rather than moving the cavity end plates, the cavity shape is deformed to compensate for the frequency shifts. The preferred embodiment accomplishes this by using a combination of materials having different coefficients of thermal expansion in such a way as to force a particular deformation in response to temperature changes.

Because of the use of cavity deformation, the mathematical analysis provided above may not apply precisely for temperature compensation. In the preferred embodiment, empirical data is used to augment an initial determination of how the cavity would be modified if a cylindrical shape were maintained. The following example demonstrates such a design, and represents a preferred embodiment of the invention.

One prominent area of use for waveguide cavity filters is in broadcast communications. In particular, ultra-high frequency (UHF) channels for digital television (DTV) have frequency allocations in the United States from approximately 473 MHz (channel 14) to 749 MHz (channel 60). It is known in the art that the optimum Q is achieved in $TE_{111}$ mode cavity filters with a D/L ratio of approximately 1 to 3. Given this characteristic, it has been found that reasonable performance may be achieved using a filter cavity having a diameter of 17" for channels 14 through 40 (frequencies from 473 MHz to 629 MHz). In these filters, the length of the cavity is dependent on the desired center frequency. Similarly, it has been found that a cavity filter having a diameter of 15" is satisfactory for channels 41–60 (frequencies from 635 MHz to 749 MHz). The ranges for desirable filter parameters for UHF communications systems is shown in the following table:

TABLE 1

| Channel No. | Frequency (MHz) | Diameter (in.) | D/L | $CTE_L/CTE_D$ |
|---|---|---|---|---|
| 14 | 473 | 17 | 0.70 | −2.80 |
| 40 | 629 | 17 | 1.38 | −0.72 |
| 41 | 635 | 15 | 1.11 | −1.10 |
| 60 | 749 | 15 | 1.50 | −0.62 |

As shown, the ratios of $CTE_L$ to $CTE_D$ for these filters range from −0.62 to −2.80. Thus, using the formulae above, the change in length to compensate for diametric expansion can be calculated. However, because the preferred embodiment relies on cavity deflection, rather than a movable end plate, an adjustment must be made to the calculated value.

The foregoing analysis may be applied to a filter construction as shown in FIGS. 1 and 2. In that embodiment, the control rods 20 control the position of the center of one cavity end plate 22 relative to the opposite side of the adjacent cavity 14. As mentioned previously, the aluminum of the cavity housings and the end deflecting rod 23 has a much higher coefficient of thermal expansion than the Invar, and so each cavity is forced to deform as the temperature increases. The appropriate parameters for constructing a UHF filter according to the embodiment of FIGS. 1 and 2 may be demonstrated using the model shown in FIG. 3.

Figure 3:
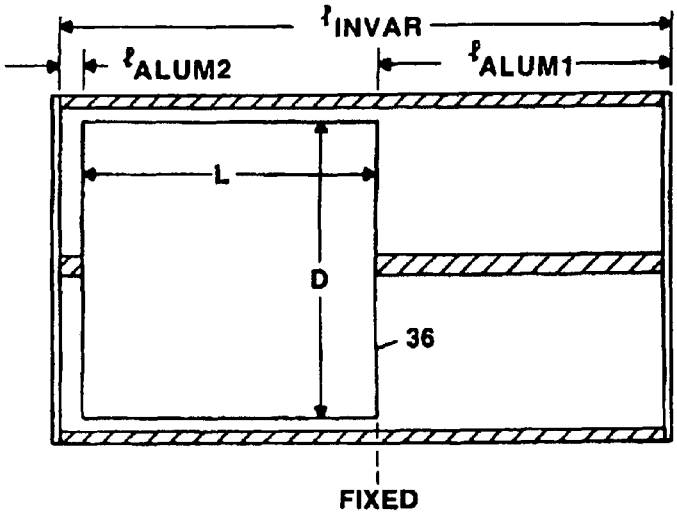
FIG. 3 is a schematic model useful in making a determination of deflection distance for thermal compensation of the filter of FIG. 1.
Figure 4:
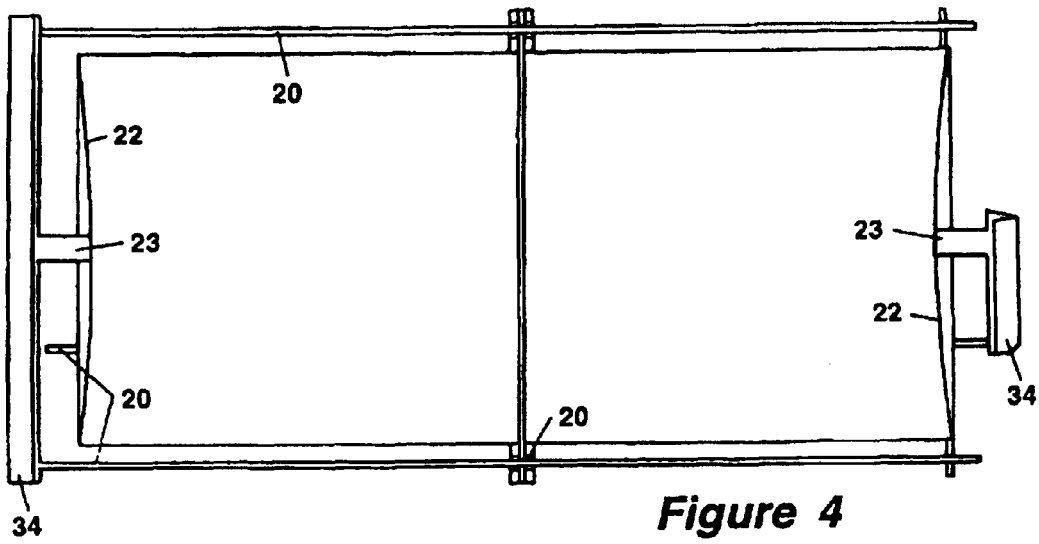
FIG. 4 is a cross-sectional side view of the filter of FIG. 1 in a high temperature state.

FIG. 3 provides a model that corresponds to the design of one of the cavities 12, 14 of the filter 10 of FIGS. 1 and 2. It will be described in the context of cavity 12 to demonstrate how the different filter components affect the cavity deformation with temperature. As shown in FIG. 3, the center point of the model is the iris plate 36, and it has a fixed position for the purposes of this analysis. The distance $l_{ALUM}$ corresponds to the length of the aluminum material of the waveguide cavity and the end deflecting rod 23. The overall length $l_{ALUM}$ is the sum of $l_{ALUM1}$, which is the length of the aluminum housing that affects the end plate, and $l_{ALUM2}$, which is the length of the aluminum end deflecting rod 23. The distance $l_{INVAR}$ corresponds to the length of the Invar rods 20.

As can be seen from FIG. 3, an increase in temperature will cause a thermal expansion in both the aluminum material and the Invar material. However, this expansion will be greater for the aluminum material, since the coefficient of thermal expansion of aluminum is much higher than that of Invar. Indeed, the net change per degree Celsius in the distance between iris plate 36 and the center point of end plate 22 of cavity 12 is may be written as:

$$CTE_{CP}=CTE_{ALUM}-CTE_{INVAR}$$

To determine an optimum length for the two materials given a filter having a particular center frequency, an approximation is first made using the filter adjustment relationships described above for a cavity in which end plate position may be adjusted without cavity deformation. Known filter parameters are also used, such as those shown above in Table 1, to optimize for the desired frequency. This is demonstrated by the following example.

If a filter having a center frequency of 749 Mhz is desired, a 15" cavity may be used. From Table 1, the ratio of $CTE_L$ to $CTE_D$ for this frequency is −0.62. Substituting this into the equation above gives the following relationship:

$$-0.62(CTE_D)(D)=(CTE_{ALUM})(l_{ALUM})-(CTE_{INVAR})(l_{INVAR})$$

The thermal expansion coefficient for aluminum is $CTE_{ALUM}=24.7\times10^{-6}$, while the thermal expansion coefficient for Invar is $CTE_{INVAR}=1.6\times10^{-6}$. Since the cavity is aluminum, $CTE_D=CTE_{ALUM}$. The foregoing equation may therefore be written as:

$$-0.62(24.7\times10^{-6})(15)=(24.7\times10^{-6})(l_{ALUM})-(1.6\times10^{-6})(l_{INVAR})$$

or, if $(l_{alum}+L)$ is substituted for $l_{INVAR}$, $$-0.62(24.7\times10^{-6})(D)=(24.7\times10^{31\ 6})(l_{ALUM})-(1.6\times10^{-6})(l_{ALUM}+L)$$

Given the D/L ratio from table 1, L=10 may be used, and the equation solved to give a value of $l_{ALUM}=9.25$. For an initial cavity length L=10, this corresponds to an Invar rod length of $l_{INVAR}=19.25$.

These values could be used in the filter of FIG. 1 to provide an approximate solution for thermal compensation. However, as discussed above, the filter of FIG. 1 does not use an end plate that moves in its entirety, and does not maintain the cylindrical shape of the cavity. Instead, to make the filter simpler and less costly to manufacture and to prevent degradation of the filter Q, the end plate 22 of cavity 12 is allowed to deform in a concave manner. Experimentation has shown that, for the filters having center frequencies in the UHF range, an additional 15% deflection of the end plate 22 of cavity 12 increases the accuracy of the compensation, and provides the resonance frequency with better stability.

As mentioned above, the present invention currently makes use of some empirical steps in determining an appropriate degree of deformation to be applied to the cavity end plate. The formulaic method above may be used to determine what an appropriate adjustment to the position of the end plate would be if no deformation of the surface was taking place. This provides a cavity parameter, in this case length, that serves as a starting point for determining the appropriate degree of cavity deformation. Thereafter, heating of the cavity and minor adjustment in the deformation, combined with measurement of the filter characteristics, allow fine-tuning of the degree of deformation. Given the description herein, such modifications are well within the ability of one skilled in the art. An example of this process is described below.

After determining an initial deflection amount from the formulae, a low power signal from a network analyzer is input to one port of the filter, and received at the other port. The scattering parameters ("S-parameters") and temperature of the filter are then measured and recorded. From the S-parameters, the center frequency is found and recorded. The filter unit is then heated in a chamber in order to obtain a change in temperature. Once the frequency response and temperature of the filter have stabilized, the S-parameters and filter temperature are again recorded. At this point, the resonant frequency of the filter will have drifted down a small amount. To compensate, the value of $l_{ALUM}$ is increased relative to $l_{INVAR}$. To increase $l_{ALUM}$, the length of the end deflecting rod 23 may be increased. Alternatively, the length of the invar rods 20 may be increased. This has the same effect, since the larger the distance between the end plate being deflected and the opposite connection point of the rods 20 on the housing, the more length of the aluminum housing there is to move the outer portions of the end plate as it expands.

By readjusting the length of $l_{ALUM}$ relative to $l_{INVAR}$ according to the measured resonant frequencies at different temperatures, the optimum length may be determined. As mentioned, for the embodiment above, this required an additional 15% deflection of the end plate. However, those skilled in the art will recognize that for other filter dimension, resonant frequencies, or even types and locations of cavity deformation, different degrees of variation may apply. Nevertheless, by applying empirical modifications, as described above, to a theoretically ideal surface movement model, the appropriate filter characteristics may be achieved.

Figure 5:
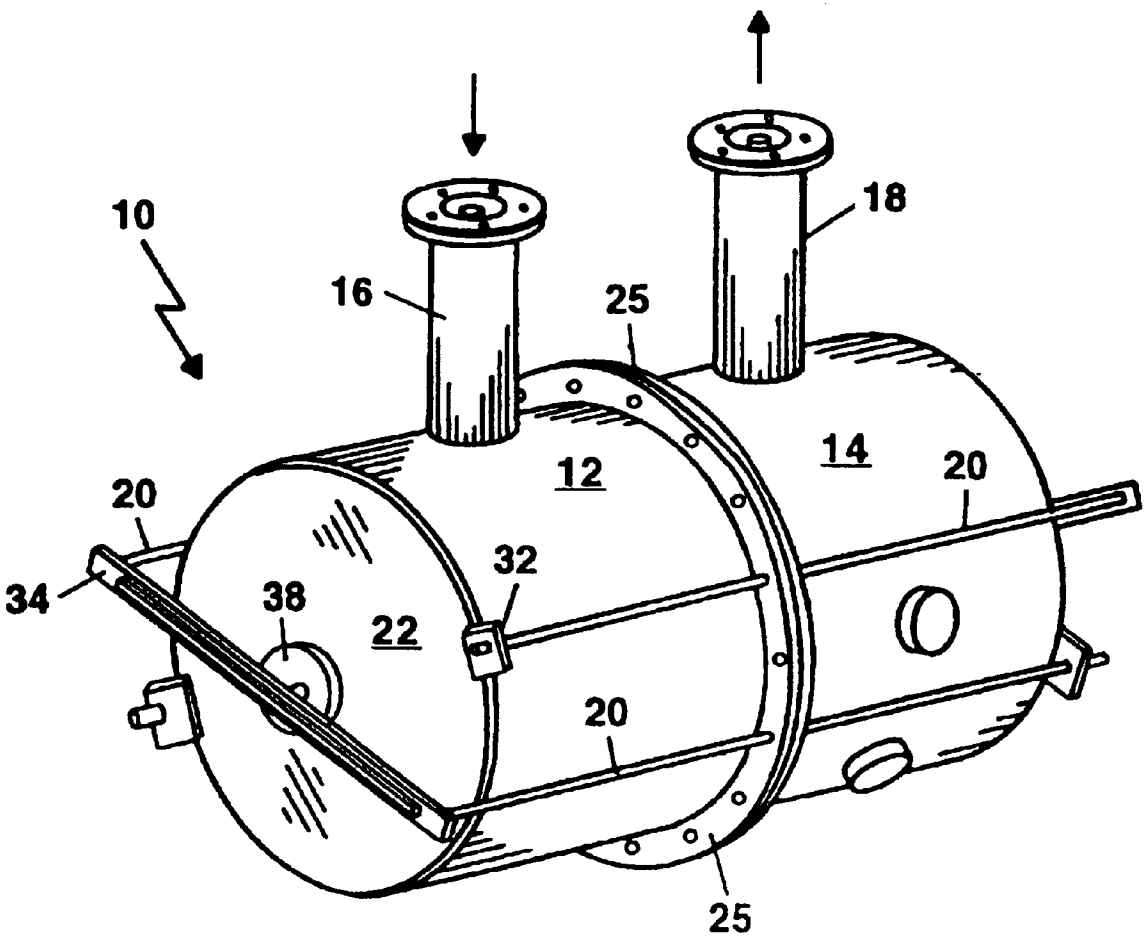
FIG. 5 is a perspective view of an alternative embodiment of the invention in which additional deflection of the filter cavity end plates is provided using extension disks.

In one variation of the preferred embodiment, the effective length of $l_{ALUM}$ is increased by attaching an extension, such as a disk, to the outside of the end plate being deflected. For example, as shown in FIG. 5, disk 38 may be used to increase the degree of deflection provided to the end plate 22. The magnitude of this increase may be controlled through selection of the material used for disk 38. For example, in the embodiment of FIG. 5, the disk 38 may be made of aluminum. In such a case, the thermal expansion of the disk would result in a much higher deflection of the end plate 22 for a given temperature than it would if it was made of a material having a lower coefficient of thermal expansion. Naturally, selection of the disk material, given the foregoing description, is well within the ability of those having ordinary skill in the art.

While the invention has been shown and described with regard to a preferred embodiment thereof, it will be recognized by those skilled in the art that various changes in form and detail may be made herein without departing from the spirit and scope of the invention as defined by the appended claims.

What is claimed is:

1. A bandpass filter comprising:

a waveguide cavity in which an input electrical signal resonates at a desired resonant frequency, the cavity having a longitudinal portion that extends in a longitudinal dimension and surrounds an interior of the cavity and an end portion that contacts the longitudinal portion so as to close off one end of the cavity along the longitudinal dimension, the longitudinal portion being prone to thermal expansion in the longitudinal dimension; and a control rod that inhibits relative movement between a point on the end portion and a point on the longitudinal portion away from the end portion such that thermally-induced changes in the longitudinal dimension of [the]*a* first surface result in a distortion of the shape of the end portion that inhibits a change in the resonant frequency.

2. A filter according to claim 1 wherein the control rod, in response to the expansion of the cavity, causes the end portion to be deflected toward an interior of the cavity.

3. A filter according to claim 2 wherein the deflection is a concave deflection.

4. A filter according to claim 2 wherein the end portion is part of an end plate of the cavity.

5. A filter according to claim 2 wherein, prior to said dimension changes of the cavity, the end portion resides substantially in a first plane and, after the dimension changes and the response of the thermal compensator, the end portion resides in a three-dimensional space that crosses the first plane.

6. A filter according to claim 1 wherein the control rod fixes a predetermined location on the longitudinal portion to a lateral support, the lateral support being connected to an end deflecting rod that limits movement of said point on the end portion relative to the control rod.

7. A filter according to claim 6 wherein the end deflecting rod comprises a material having a coefficient of thermal expansion significantly greater than that of the control rod.

8. A filter according to claim 1 wherein said point on the end portion resides in a first plane perpendicular to the longitudinal dimension at a first temperature and, in response to said thermally-induced changes, is displaced substantially out of the first plane.

9. A filter according to claim 1 wherein the waveguide cavity is a first waveguide cavity, and wherein the filter further comprises a second waveguide cavity coupled with the first waveguide cavity so as to receive a filtered version of the input signal output by the first waveguide cavity.

10. A filter according to claim 9 wherein the filter is a multiple section filter and further comprises a coaxial resonator electrically coupled to the waveguide cavities.

11. A filter according to claim 10 wherein the filter is a six-section filter and comprises two waveguide cavities and two coaxial resonators.

12. A filter according to claim 11 wherein the coaxial resonators are coupled to the waveguide cavities via impedance inverters.

13. A bandpass filter comprising:

a waveguide cavity in which an input electrical signal resonates at a desired resonant frequency, the cavity having a plurality of surfaces each with a predetermined geometric shape, a first one of the surfaces being subject to thermal expansion upon an increase in filter temperature, said thermal expansion resulting in an increase in dimensions of the cavity; and a thermal compensator comprising:

a control rod having a first end fixed to a predetermined location on a housing of the filter and a second end apart from the first end in a direction of said thermal expansion, the control rod having a coefficient of thermal expansion significantly different than that of the first surface; and a deflecting rod having a first end fixed, in the thermal expansion direction, relative to the second end of the control rod, the deflecting rod limiting movement of a point on a second one of said surfaces in [the]*a* first direction such that, in response to thermally-induced changes in dimensions of the cavity, the shape of the second surface is distorted to counteract an increase in cavity dimension.

14. A method of limiting a shift in the resonant frequency of a waveguide cavity bandpass filter that would otherwise result from thermal expansion of a longitudinal portion of the filter that extends in a longitudinal dimension and surrounds an interior of the cavity, wherein the longitudinal portion is connected to an end portion that closes off one end of the cavity along the longitudinal dimension, the method comprising inhibiting relative movement between a point on the end portion and a point on the longitudinal portion away from the end portion such that thermally-induced changes in the longitudinal dimension of the first surface result in a distortion of the shape of the end portion that inhibits a change in the resonant frequency.

15. A method according to claim 14 wherein the distortion comprises a deflection of the end portion toward an interior of the cavity.

16. A method according to claim 14 wherein the method comprises providing a control rod having a coefficient of thermal expansion that is significantly lower than that of the longitudinal portion and that limits said relative movement.

17. A method according to claim 14 further comprising:

determining a theoretical amount of movement of the end portion relative to other surfaces of the cavity that would be required to compensate for a shift in resonant frequency of the cavity due to thermally-induced changes in the dimensions of the cavity if the shape of the end portion was not distorted; and setting an amount of a deflection of the end portion that would occur due to an expected thermal expansion of the longitudinal portion to be equal to said theoretical amount of surface movement plus an additional amount to compensate for distortion of the first surface.

18. A method according to claim 17 wherein said additional amount is determined empirically.

19. A method according to claim 16 wherein the control rod fixes a predetermined location on the longitudinal portion to an end deflecting rod that limits movement of said point on the end portion relative to the control rod.

20. A method according to claim 19 wherein the end deflecting rod comprises a material having a coefficient of thermal expansion significantly greater than that of the control rod.

21. A method according to claim 14 wherein the waveguide cavity is a first waveguide cavity, and wherein the filter further comprises a second waveguide cavity coupled with the first waveguide cavity so as to receive a filtered version of the input signal output by the first waveguide cavity.

22. A method according to claim 21 wherein the filter is a multiple section filter and the method further comprises providing a coaxial resonator electrically coupled to the waveguide cavities.

23. A method according to claim 22 wherein the filter is a six-section filter and the method comprises providing two waveguide cavities and two coaxial resonators.

24. A method according to claim 23 wherein the method further comprises coupling each of the coaxial resonators to the waveguide cavities via impedance inverters.

25. A method of thermally compensating a bandpass filter having a waveguide cavity in which an input electrical signal resonates at a desired resonant frequency, wherein the cavity has a longitudinal portion that is subject to thermal expansion in a longitudinal dimension upon an increase in the filter temperature and an end portion that closes off one end of the cavity along the longitudinal dimension, said thermal expansion resulting in an increase in dimensions of the cavity, the method comprising:

providing a control rod having a first end fixed to a predetermined location on the longitudinal portion and a second end apart from the first end in a direction of said thermal expansion, the control rod having a coefficient of thermal expansion significantly different than that of [the]*a* first surface; and fixing a first end of a deflecting rod to the second end of the control rod in the thermal expansion direction, and locating the deflecting rod so as to limit movement of a point on the end portion in a first direction in the longitudinal dimension such that, in response to thermally-induced changes in dimensions of the cavity, the shape of the end portion is distorted so as to inhibit any change in the desired resonant frequency due to said increase in cavity dimensions.

*26. A bandpass filter having a normal operating temperature greater than ambient temperature, comprising:*

*(a) a waveguide cavity;*

*(b) an elongated structure located external to said cavity in the ambient environment and having a temperature lower than said operating temperature of said cavity when said cavity is in use, said structure being mechanically coupled to said cavity between two points spaced by a predetermined separation distance,*

*i. the structure having a CTE (coefficient of thermal expansion) and an operating temperature relative to the CTE and the operating temperature of said cavity which causes said separation distance between the points on the cavity to expand or contract more than said structure expands or contracts across said separation distance when the operating temperature of the cavity changes,*

*(c) the resulting temperature-induced dimensional differences between said structure and said cavity across said separation distance creating temperature-dependent mechanical movement of said structure relative to said cavity which is employed to reduce the frequency drift of said cavity with variations in operating temperature.*

*27. The filter of claim 26 wherein said cavity is composed at least in part of aluminum, and said structure is composed of a material with a CTE lower than the CTE of aluminum.*

*28. The filter of claim 27 wherein said structure is composed at least in part of Invar.*

*29. The filter of claim 26 wherein said structure includes a first section composed of material having a CTE lower than the CTE of the cavity and a connected second section composed of a material having a CTE higher than the CTE of the first section of the structure.*

*30. The filter of claim 29 wherein said second section is coupled directly to said cavity.*

*31. A bandpass filter having a normal operating temperature greater than ambient temperature, comprising:*

*(a) a waveguide cavity;*

*(b) an elongated structure located external to said cavity in the ambient environment and having a temperature lower than said operating temperature of said cavity when said cavity is in use, said structure being mechanically coupled to said cavity between two points spaced by a predetermined separation distance,*

*i. the structure having a CTE and an operating temperature relative to the CTE and the operating temperature of said cavity which causes said separation distance between the points on the cavity to expand or contract more than said structure expands or contacts across said separation distance when the operating temperature of the cavity changes,*

*(c) the resulting temperature-induced dimensional differences between said structure and said cavity across said separation distance creating temperature-dependent mechanical movement of said structure relative to said cavity which is employed to deform cavity and thereby to reduce the frequency drift of said cavity with variations in operating temperature.*

*32. The filter of claim 31 wherein said cavity is composed at least in part of aluminum, and said structure is composed of a material with a CTE lower than the CTE of aluminum.*

*33. The filter of claim 32 wherein the structure is composed at least in part of Invar.*

*34. The filter of claim 31 wherein said structure includes a first section composed of material having a CTE lower than the CTE of the cavity and a connected second section composed of a material having a CTE higher than the CTE of the first section of the structure.*

*35. The filter of claim 34 wherein said second section is coupled directly to said cavity.*

* * * * *